United States Patent [19]
Bartholomew

[11] 3,747,993
[45] July 24, 1973

[54] AIR/HYDRAULIC PARKING-EMERGENCY BRAKE SYSTEM

[75] Inventor: Roy E. Bartholomew, Elyria, Ohio

[73] Assignee: The Bendix Corporation, South Bend, Ind.

[22] Filed: Dec. 27, 1971

[21] Appl. No.: 211,862

[52] U.S. Cl. .............................................. 303/68
[51] Int. Cl. .......................................... B60t 15/02
[58] Field of Search ................................... 303/68

[56] References Cited
UNITED STATES PATENTS

| | | | |
|---|---|---|---|
| 1,964,071 | 6/1934 | Neveu | 303/68 |
| 2,392,185 | 1/1946 | Pickert | 303/68 |
| 2,408,129 | 9/1946 | Sudduth | 303/68 |
| 2,678,242 | 5/1954 | Pickert | 303/68 |
| 3,001,832 | 9/1961 | McClure et al. | 303/68 |
| 3,467,441 | 9/1969 | Clark et al. | 303/68 |
| 3,480,336 | 11/1969 | Clark et al. | 303/68 |
| 3,695,734 | 10/1972 | Hennig et al. | 303/68 |

*Primary Examiner*—Lloyd L. King
*Attorney*—Ken C. Decker et al.

[57] ABSTRACT

A braking system is disclosed which uses pressurized air to develop hydraulic pressure for maintaining the spring actuator in a spring-applied disc brake in the release position. The actuator includes a recycling valve which sequentially initiates and terminates air communication to an air-actuated hydraulic intensifier. The hydraulic outlet of the intensifier is connected to the inlet of a control valve, and the outlet of the control valve is connected to the hydraulic release mechanism of the spring brake. Another inlet port of the control valve is connected to an operator-operated parking brake control which communicates air pressure to the control valve when the vehicle operator releases the spring brake. When air pressure is communicated to the control valve, the latter shifts from a first position venting the hydraulic release mechanism of the spring brake to a fluid reservoir through the inlet port of the control valve, to a second position permitting generally uninhibited fluid communication from the inlet of the control valve to the outlet, but preventing fluid communication in the reverse direction, to thereby permit the fluid pressure level in the hydraulic release mechanism to increase as the pressure intensifier cycles.

15 Claims, 2 Drawing Figures

Patented July 24, 1973

INVENTOR.
ROY E. BARTHOLOMEW
BY
*Ken C. Durker*
ATTORNEY

INVENTOR.
ROY E. BARTHOLOMEW
BY
ATTORNEY

AIR/HYDRAULIC PARKING-EMERGENCY BRAKE SYSTEM

BACKGROUND OF THE INVENTION

This invention relates to a spring brake control mechanism.

For safety, it has become customary to provide heavy duty commercial vehicles with spring-actuated brakes which require fluid pressure to release them. The spring actuators apply the vehicle brakes when the latter is parked, and the vehicle operator must release the brakes after the vehicle engine is started before the vehicle may be moved.

Most existing heavy duty brake systems are actuated by air pressure, and consequently, include an air pressure released spring brake actuator. However, disc brakes possess many advantages over prior art brakes used in commercial vehicles, but disc brakes generally require a hydraulic pressure source for actuation. In order to make vehicles equipped with disc brakes compatible with other vehicles which do not have disc brakes, it is desirable to provide a hydraulic pressure developing device which is actuated by air pressure. Since spring-actuatd disc brakes also require a fluid pressure hold-off mechanism to release the spring actuator, it is necessary to provide a device which is capable of developing hydraulic hold-off pressure from the air pressure developed by the vehicle's air compressor. Such a device must also be capable of recycling to maintain the predetermined release pressure in the spring actuator while the vehicle is driven.

SUMMARY OF THE INVENTION

Therefore, an important object of my invention is to provide a braking system which utilizes energy supplied by the vehicle's air system to develop hydraulic fluid pressure which is used to release a spring brake actuator.

Another important object of my invention is to provide a relatively simple mechanism to release a spring brake actuator requiring hydraulic pressure.

Another important object of my invention is to provide a braking system having a single intensifier which is capable of handling the fluid requirement on all vehicles regardless of the number of axles.

Another important object of my invention is to provide a hydraulic spring brake release mechanism which is compatible with existing air-actuated parking emergency braking systems.

DETAILED DESCRIPTION

Figure 1:
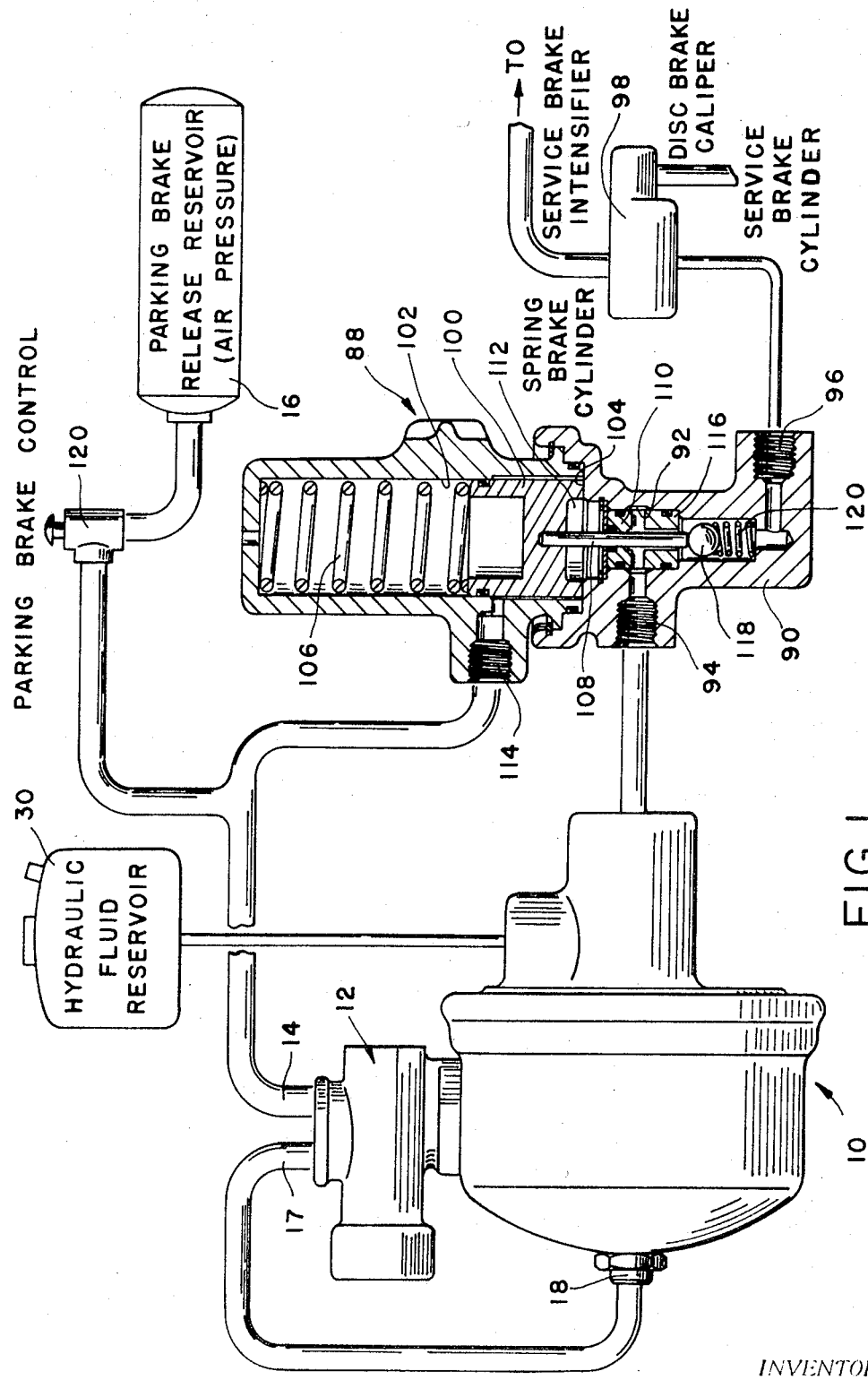
FIG. 1 is a schematic illustration of a braking system made pursuant to my present invention with the control valve used therein illustrated in cross section.

Referring now to the drawings, a pressure intensifier generally indicated by the numeral 10 includes a recycling valve 12 having an inlet port 14 communicated to an inner pressure source, such as an air pressure reservoir 16. The reservoir 16 is charged by the vehicle's conventional air pressure compressor (not shown), which is powered by the vehicle engine. The recycling valve 12 further includes an outlet port 17 which is communicated within an inlet port 18 communicating with a compartment 20 within the intensifier 10.

A pressure chamber 22 is defined within the intensifier 10 and slidingly and sealingly receives one end of a piston 24, the other end of which projects into the compartment 20. The chamber 22 is provided with an outlet port 26 and an inlet port 28, which is communicated to hydraulic fluid reservoir 30. A valve 32 is operated by movement of the piston 24, and is usually maintained open to permit communication between the reservoir 30 and pressure chamber 22. However, when the piston 24 is urged to the right viewing FIG. 2 in excess of a predetermined distance, the valve closes to terminate fluid communication into the pressure chamber 22 through the inlet port 28. The valve 32 is of a conventional design well known to those skilled in the art of designing master cylinders, and will not be further described herewithin. A spring 34 housed within the chamber 22 yieldably urges the piston 24 to the left (viewing FIG. 2). A movable wall 36 is carried on the other end of the piston 24. A flexible diaphragm 38 interconnects the outer peripheral edge of the movable wall 36 with the wall of the intensifier 10. As will be readily observed by those skilled in the art, as piston 24 and movable wall 36 move to the right viewing FIG. 2, the flexible diaphragm 38 will unroll along the wall of the intensifier housing. The movable wall 36 and the diaphragm 38 cooperate to divide the compartment 20 into a first section 40 which communicates with the inlet port 18 and into a second section 42 which is communicated to the exterior of the housing.

The recycling valve 12 includes a housing 44 defining a bore 46 therewithin. A piston 48 is slidably mounted within the bore 46 and is adapted to operate a valve element generally indicated by the numeral 50. Piston 48 is stepped to define a shoulder 52 which is urged into engagement with corresponding portion 54 of the housing 44 by a spring 56. The shoulder 52 cooperates with the wall of the housing 44 to define an annular control chamber 58 therebetween. The housing 44 further includes an exhaust port 60 in one end thereof. The valve element 50 includes a center member 62 and a pair of outer members 64, 66 disposed on opposite sides of the center member 62. Openings (not shown) permit fluid communication around the periphery of the valve element 50 between the inlet chamber 68 communicated with the inlet 14 and the outlet chamber 70 communicated with the outlet port 17.

A second bore 72 is also defined within the housing 44 which slidably mounts a second valve element 74 therewithin. The valve element 74 cooperates with a seating area 76 on the bore 72 to divide the latter into an inlet chamber 78 and an outlet chamber 80. The inlet chamber 78 is communicated to the inlet port 14, and a passage 82 communicates the outlet chamber 80 to the control chamber 58. Another passage 84 communicates the passage 82 into the section 42 of the compartment 20. A spring 86 urges the valve member 74 into sealing engagement with the shoulder 76 to normally prevent fluid communication between the inlet chamber 78 and the outlet chamber 80. However, it will be noted that the valve member 74 projects into the compartment 20, and is adapted to be engaged by the flexible member 38 when the piston 24 shifts a sufficient distance. The flexible member 38 then forces the valve member 74 off of the valve seat 76 to permit communication between the inlet chambers 78 and the outlet chamber 80.

Figure 2:
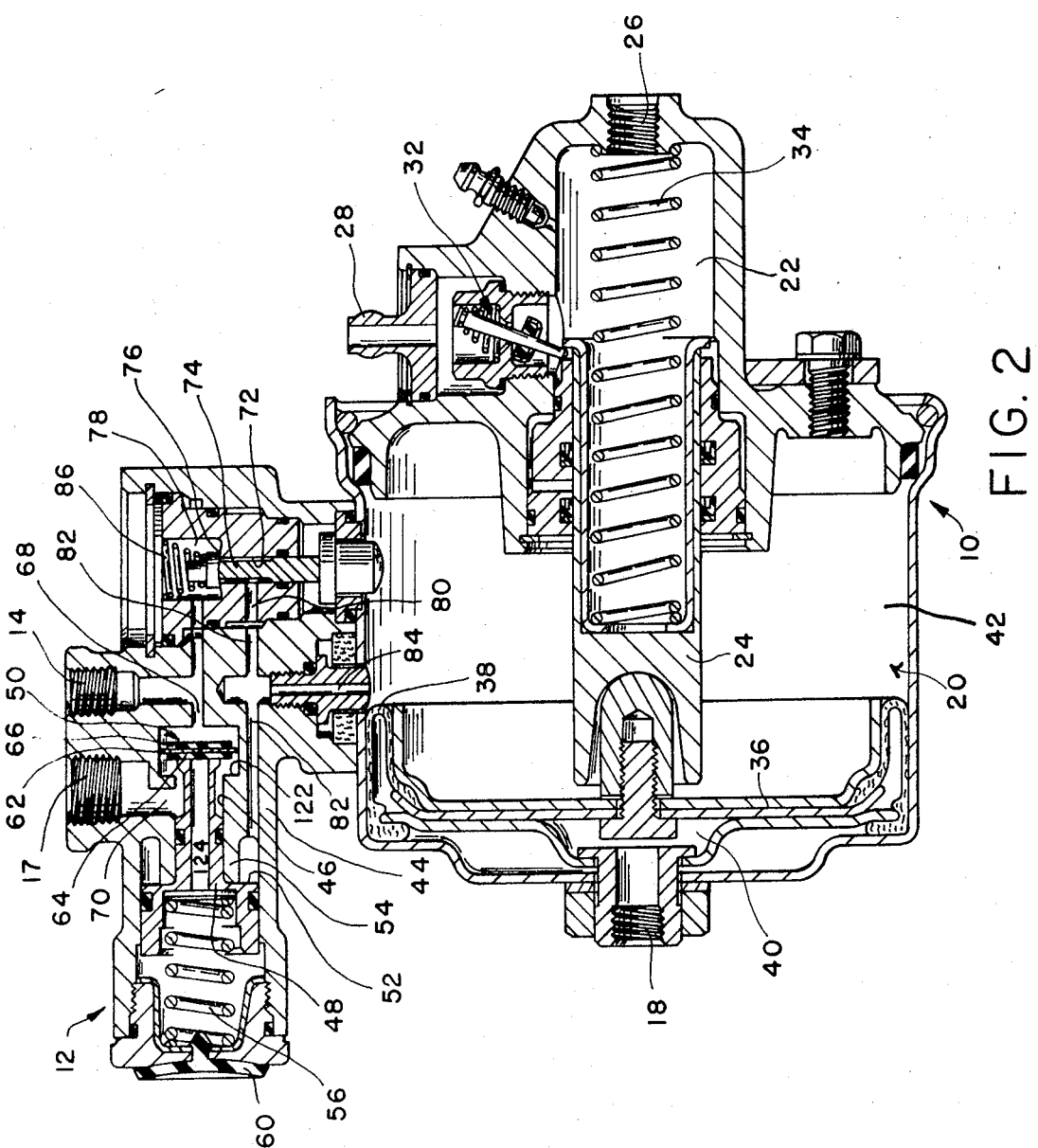
FIG. 2 is a cross-sectional view of a pressure intensifier used in the braking system illustrated in FIG. 1.

The braking system of FIGS. 1 and 2 further includes a control valve generally indicated by the numeral 88 which includes a housing 90 defining a bore 92 therewithin. An inlet port 94 communicates the bore 92 with the outlet port 26 of the intensifier 10, and an outlet port 96 communicates the bore 92 with the hydraulic spring brake release mechanism housed within the disc brake caliper 98. A piston 100 is slidably mounted within a larger diameter portion 102 of the bore 92 and is yieldably urged into engagement with a shoulder 104 on the housing 90 by a spring 106. A rod 108 extending from the piston 100 projects through an annular closure 110 mounted in the bore 92 and is sealed therewith to prevent communication between the larger portion of the bore 102 and the smaller diameter portion of the latter. A pressure chamber 112 is defined between the closure member 110 and the end of the piston 100 which is communicated with the reservoir 16 through inlet port 114. A valve seat 116 is disposed within the bore 92 between the inlet port 94 and the outlet port 96 and is adapted to cooperate with a sphere 118 which is yieldably urged into engagement with the seat 116 by a spring 120 to prevent fluid communication between the ports 96 and 94. However, since the force exerted by spring 106 is greater than the force exerted by spring 120, the rod 108, which also extends through the valve seat 116, maintains the sphere 118 out of sealing engagement with the valve seat 116 when the piston is engaged with the shoulder 104. Communication between the air reservoir 16 and the inlet ports 114 and 14 is controlled by an operator-operated control valve 120, which normally prevents communication from the reservoirs 16, but may be actuated by the vehicle operator to communicate fluid to the ports 14 and 114.

MODE OF OPERATION

The various components of the braking system illustrated in FIGS. 1 and 2 are illustrated in the positions which they assume when the spring brake actuator is applied. In this position, the rod 108 maintains the sphere 118 away from the valve seat 116, to permit fluid pressure in the hydraulic release mechanism of the spring brake actuator to be vented to the hydraulic fluid reservoir through the bore 92, the pressure chamber 22, and the inlet port 28. When the vehicle is to be moved, the vehicle operator actuates the valve 120 to communicate air to the ports 14 and 114 from the reservoir 16. Air pressure at the inlet port 114 is communicated into the chamber 112, where it acts upon the end of the piston 100 urging the latter upwardly viewing FIG. 1 against the force of the spring 106. When this occurs, the spring 120 yieldably urges the sphere 118 into sealing engagement with the valve seat 116, to thereby prevent fluid communication from the outlet port 96 to the inlet port 94, but permitting fluid communication from the port 94 to the port 96. At the same time, the spring 56 maintains valve member 50 in the position illustrated, to permit communication of air pressure at the port 14 around the valve member 50 to the outlet port 17 and then through the appropriate conduit to the inlet port 18. Fluid pressure from the inlet port 18 is communicated into the chamber 40 where it acts across the end of the movable wall 36 to urge the piston 24 to the right viewing FIG. 2. As the piston 24 moves, the valve 32 first closes to terminate fluid communication from the reservoir 30 into the pressure chamber 22. Further movement of the piston 24 then pressurizes the fluid in the chamber 22, which is communicated from the chamber 22 into the bore 92, through the valve seat 116, and into the hydraulic release mechanism contained within the disc brake caliper 98. As the wall 36 moves, the diaphragm 38 unrolls against the wall of the intensifier housing. When the diaphragm 38 has travelled a sufficient distance to cover the passage 84, fluid communication between the control chamber 58 and the exterior of the housing is terminated. When the diaphragm unrolls a predetermined additional distance, the valve member 74 is urged away from the valve seat 76 to permit fluid communication into the control chamber 58 from the inlet port 14. High pressure fluid in the control chamber 58 urges the piston 48 to the left viewing FIG. 2 against the bias of the spring 56. As the latter moves, high pressure air in the inlet port 14 also urges the valve element 50 to the left, to permit the outer resilient section 64 of the latter to sealingly engage a valve seat 122 defined within the bore 46, thereby preventing further fluid communication between the inlet port 14 and the outlet port 17. As the piston 48 moves an additional distance, the end of the piston moves away from the outer section 64 of the valve member 50, thereby permitting fluid communication between the exhaust port 60 and the outlet port 17 through the passage 124 extending axially through the piston 48. Therefore, the fluid pressure in the section 40 of compartment 20 is exhausted to the atmosphere, thereby permitting the spring 34 to urge the piston 24 and the movable wall 36 into the position illustrated in FIG. 2. As the diaphragm 38 again moves to the left, the valve member 74 is first released and the passage 84 is again opened, to again vent the control chamber 58 to atmosphere. The spring 56 then urges the piston 48 and valve 50 into position illustrated. It will be noted that as the fluid in the chamber 22 is pressurized by movement of piston 24 to the right viewing FIG. 2, pressurized fluid is communicated to the hydraulic release mechanism contained in the disc brake caliper 98 through the outlet port 26, inlet port 94, the valve seat 116 in the bore 92, and through the outlet port 96. However, when the piston 24 moves to the left, viewing FIG. 2, fluid pressure is prevented from exhausting from the spring brake release mechanism within the caliper 98 because of the engagement of the sphere 118 with seat 116.

When the movable wall 36 is again urged into the position illustrated in FIG. 2, air pressure is again communicated into the section 40 of compartment 20, which again urges the piston 24 to the right viewing FIG. 2. It will be noted that the pressure level in chamber 22 during movement of the piston 24 to the right is the same as the fluid pressure level in the hydraulic release mechanism within the disc brake caliper 98. The intensifier 10 continues to cycle in this manner until the fluid pressure level in the hydraulic release mechanism within the caliper 98 equals the force exerted by air pressure in section 40 acting on movable wall 36. When this occurs, the piston is in equilibrium and does not move. However, if the hydraulic pressure in the release mechanism reduces during operation of the vehicle, due to temperature changes or for any other reason, the intensifier 10 will automatically begin to cycle to maintain the pressure in the release mechanism at a level such that the brake shoes will not drag against the disc. When the vehicle is parked and the operator applies the disc brake spring actuator, the control valve 120 is moved to a position venting the inlet ports 114 and 14 to atmosphere. When this occurs, pressure in the section 40 of compartment 20 is vented to the atmosphere through the port 17, chambers 70 and 68, inlet 14, and the exhaust of the parking control valve 120. The spring 34 urges the piston 24 to the left toward the position illustrated in the drawing, opening the valve 32 to permit communication between the chamber 22 and the fluid reservoir 30. At the same time, the air pressure in the chamber 112 is also vented, permitting the spring 106 to urge the piston 100 toward a position maintaining the sphere 118 out of engagement with the valve seat 116 to vent the hydraulic release mechanism within the caliper 98 to the reservoir 30 so that the pressure level in the release mechanism is abruptly reduced to permit the spring actuator to apply the disc brake.

I claim:

1. In a vehicle having spring-actuated, hydraulically released brakes and a source of air pressure, a control system for developing hydraulic pressure to release said spring-actuated brakes comprising:
   a fluid reservoir;
   fluid pressure developing means having a pressure chamber communicated to said reservoir, said fluid pressure developing means being responsive to said air pressure source to sequentially terminate fluid communication between the reservoir and the pressure chamber and thereafter pressurizing the fluid in said chamber; and
   operator-operated valve means shiftable from a first position terminating communication between the air pressure source and said fluid pressure developing means and venting said spring-actuated brakes to said reservoir to a second position communicating said air pressure source to said fluid pressure developing means and permitting fluid communication from the pressure chamber to said spring-actuated brakes, but preventing communication in the reverse direction from the brakes to the pressure chamber.

2. The invention of claim 1:
   said fluid pressure developing means including cycling means sequentially initiating and terminating communication between the air pressure source, and the fluid pressure developing means to sequentially terminate fluid communication into the chamber and pressurize the fluid within the chamber.

3. The invention of claim 1:
   said operator-operated valve means including a housing having an inlet communicated to said pressure chamber, an outlet communicated to said spring-actuated brakes, valve structure controlling communication between said inlet and outlet responsive to air pressure from said source to shift from a first condition permitting substantially uninhibited fluid communication between the inlet and outlet to a second condition permitting fluid communication from the inlet to the outlet but preventing communication in the reverse direction, and operator-operated control means controlling communication between said air pressure source and said valve structure.

4. The invention of claim 3:
   said valve structure including a pressure responsive piston, and resilient means urging said piston toward a position maintaining said valve structure open, said piston moving against the bias of said resilient means to permit said valve means to close when said control means admits air pressure from said source to said piston.

5. The invention of claim 3:
   said valve structure including a valve seat, a valve poppet, first resilient means yieldably urging said poppet into sealing engagement with said seat, a pressure responsive piston, second resilient means yieldably urging said piston against said poppet and thereafter urging said poppet away from said valve seat against the bias of said first resilient means, said piston moving against the bias of said second resilient means to permit said first resilient means to urge said poppet into sealing engagement with said valve seat when said control means admits air pressure from said source to said piston.

6. In a device for pressurizing fluid actuated by pressurized air:
   a housing defining a chamber therewithin;
   piston means slidably mounted in said chamber, opposite ends of said piston cooperating with corresponding ends of said housing to define a pair of fluid compartments therebetween;
   one of said compartments having an outlet port, and an inlet port communicated to a fluid reservoir;
   resilient means yieldably urging said piston means toward the other compartment, said piston means causing termination of fluid communication through said inlet port and thereafter pressurizing fluid in said one compartment as said piston means is urged toward said one compartment against the bias of said resilient means; and
   valve means sequentially admitting pressurized air into said other compartment to drive said piston toward said one compartment and thereafter exhausting said other compartment to permit said resilient means to urge said piston means toward the other compartment.

7. The invention of claim 6:
   said valve means being responsive to movement of said piston to communicate pressurized air into said one compartment until said piston moves a predetermined distance in response to said pressurized air, whereupon said valve means exhausts said other compartment to permit said resilient means to urge said piston means toward the other compartment.

8. The invention of claim 6:
   said valve means including a housing defining a bore therewithin having an inlet communicated with an air pressure source, an outlet communicated to said other chamber, and an exhaust port communicating with the exterior of the housing; and
   a first valve member within said bore shiftable from a first position permitting communication between said inlet and outlet to communicate pressurized air into said other compartment and preventing communication to said exhaust port, to a second position communicating said outlet to said exhaust port and preventing communication between the inlet and outlet.

9. The invention of claim 8:

a piston member slidable in said bore and operably connected to said first valve member for shifting the latter; and resilient means yieldably urging said piston toward a position maintaining said first valve means in said first position.

10. The invention of claim 9:

said piston member including a reactive portion cooperating with the wall of said housing to define a control chamber therebetween opposing said resilient means;

said control chamber normally being vented to the exterior of said housing to permit said resilient means and said piston member to urge the first valve member toward its first position.

11. The invention of claim 10:

means responsive to movement of said piston member to terminate fluid communication between said control chamber and the exterior of the housing and thereafter communicating said control chamber with said pressure source to urge said piston against the bias of said resilient means, whereby said first valve shifts to said second position.

12. The invention of claim 11:

first passage means communicating said control chamber to said inlet;

a second valve member shiftable from a first position preventing communication through said passage means to a second position permitting communication through said passage means; and resilient means yieldably urging said second valve member to said first position, said second valve member being urged to said second position by movement of said piston means.

13. The invention of claim 12:

said piston means including a movable wall dividing said other compartment into a first section receiving said pressurized air and into a second section vented to the atmosphere, and a flexible diaphragm connecting the edge of said movable wall to said housing, said second valve member projecting into said second section;

second passage means communicating said control chamber to said second section, said piston means and said diaphragm cooperating to terminate communication through said second passage means and shift said second valve means to said second position when said piston means moves a predetermined distance.

14. In a fluid control valve:

a housing defining a bore therewithin having an inlet port, an outlet port and an exhaust port;

first valve means slidably in said bore and shiftable from a first position permitting communication between the inlet and outlet ports and preventing communication through said exhaust port to a second position terminating communication between the inlet and outlet ports and communicating the outlet port to said exhaust port;

control piston means slidable in said bore for actuating said first valve means, said piston means cooperating with the wall of the housing to define a control chamber therebetween;

resilient means urging said piston means toward a position maintaining said first valve means in said first position;

said control chamber normally being vented to the exterior of the housing to permit said resilient means to urge said piston toward said position maintaining said first valve means in said first position, but being communicated to the inlet port to shift said first valve means toward said second position.

15. The invention of claim 14:

passage means communicating said control chamber to said inlet port; and second valve means normally preventing communication through said passage means, but being shiftable to a position permitting communication through said passage means when said first valve means is shifted toward said second position.

* * * * *